United States Patent
Chen et al.

(10) Patent No.: US 6,194,512 B1
(45) Date of Patent: Feb. 27, 2001

(54) PHENOL/FORMALDEHYDE AND POLYACRYLIC ACID CO-BINDER AND LOW EMISSIONS PROCESS FOR MAKING THE SAME

(75) Inventors: Liang Chen, New Albany; Richard Wolever, Granville, both of OH (US)

(73) Assignee: Owens Corning Fiberglas Technology, Inc., Simmit, IL (US)

( * ) Notice: Subject to any disclaimer, the term of this patent is extended or adjusted under 35 U.S.C. 154(b) by 0 days.

(21) Appl. No.: 09/340,792

(22) Filed: Jun. 28, 1999

(51) Int. Cl.[7] .............. C08L 61/00; C08L 71/12; B22C 1/00

(52) U.S. Cl. ............. 524/594; 524/597; 524/611; 523/139; 523/149

(58) Field of Search .............. 164/17; 264/113; 523/139, 149; 524/594, 597, 611, 612; 525/508, 451, 418, 502, 518, 519

(56) References Cited

U.S. PATENT DOCUMENTS

| | | | |
|---|---|---|---|
| 2,676,898 | | 4/1954 | Folger et al. . |
| 4,131,582 | * | 12/1978 | Kako et al. .................. 260/29.3 |
| 4,757,108 | * | 7/1988 | Walisser ...................... 524/596 |
| 5,185,197 | * | 2/1993 | Nixon .......................... 428/900 |
| 5,318,990 | | 6/1994 | Strauss . |
| 5,362,842 | | 11/1994 | Graves et al. . |
| 5,538,761 | * | 7/1996 | Taylor ........................ 427/389.8 |
| 5,612,405 | * | 3/1997 | Bainbridge et al. ............ 524/510 |
| 5,623,032 | | 4/1997 | Wu . |
| 5,670,585 | * | 9/1997 | Taylor et al. ................. 525/508 |
| 5,932,665 | * | 8/1999 | DePorter et al. .............. 525/381 |

* cited by examiner

Primary Examiner—Edward J. Cain
Assistant Examiner—Katarzyna Wyrozebski
(74) Attorney, Agent, or Firm—Inger H. Eckert; Stephen W. Barns

(57) ABSTRACT

An aqueous phenol/formaldehyde resole resin is disclosed having improved speciation. An aqueous extended phenol/formaldehyde and polycarboxylic acid co-binder and low emissions process for making the same are also disclosed. Glass fiber products may be prepared using the co-binder.

42 Claims, 1 Drawing Sheet

PHENOL/FORMALDEHYDE AND POLYACRYLIC ACID CO-BINDER AND LOW EMISSIONS PROCESS FOR MAKING THE SAME

BACKGROUND OF THE INVENTION

1. Field of the Invention

The invention relates to the field of binders for glass fibers. Specifically, the invention relates to a low emissions process for making a co-binder including phenol/formaldehyde binder and polyacrylic acid binder, and the co-binder composition made by the process.

2. Background Information

Manufacture of glass fiber thermal insulation may be carried out by a continuous process whereby molten glass flows from a melting furnace, divides into streams, and attenuates into fibers. The fibers are collected on a conveyor belt to form a mat. The fibers are bonded together to form an integral structure by a curable liquid resinous binder sprayed onto the fibers as they are dropping onto the collecting conveyor belt. The binder-coated layer of fiber is then passed through a curing oven to cure the binder. Under the curing conditions, any remaining aqueous solvent is evaporated, and the phenol/formaldehyde resole cures to a thermoset state. The fibers in the resulting fiberglass product are thus partially coated with a thin layer of thermoset resin, which tends to accumulate at the junctions where fibers cross each other. The resulting product exhibits higher recovery than a fiberglass product not incorporating a binder. The cured binder imparts strength and resiliency to the structure.

The organic binders most commonly employed are heat-curable aqueous thermosetting resins of the phenol formaldehyde type. Generally, the binder system requirements are for a low-cost water soluble or water dispersable composition which can be easily applied and readily cured. The product should be relatively stable for periods of time long enough to permit mixing and application at temperatures ordinarily encountered in fiberizing plants, and the composition should be dilutable. The cured binder product must provide a strong bond with sufficient elasticity and thickness recovery to permit reasonable deformation of the thermal insulating product. Thickness recovery is important if full insulating value is to be obtained after installation.

Manufacturers of glass fiber products also find they must deal with the formaldehyde vapors associated with handling ordinary resoles which pose a number of environmental and safety issues.

Typically, when a phenol-formaldehyde resole resin is used as a binder, e.g. for manufactured boards and fiber insulation products, the binder releases a significant amount of formaldehyde into the environment during cure. Formaldehyde also can be released subsequently from the cured resin, particularly when the cured resin is exposed to acidic environments. Such formaldehyde release is undesirable, particularly in enclosed spaces. Formaldehyde may be inhaled by workers and comes into contact with the eyes, the mouth, and other parts of the body. Formaldehyde is malodorous and is thought to contribute to human and animal illness. It is, therefore, desirable to reduce the release of formaldehyde into the environment.

Various techniques have been used to reduce formaldehyde emission from formaldehyde-based resins. In particular, various formaldehyde scavengers (i.e., chemicals usually added to the resin during or after its preparation) have been used in an attempt to reduce formaldehyde emissions. Urea is often selected because it is less expensive compared to other formaldehyde scavengers. Urea acts as a formaldehyde scavenger both at, and subsequent to, the manufacture of the product. Urea is typically added directly to the phenol-formaldehyde resin, to produce a urea-extended phenol-formaldehyde resole resin (known in the art as "premix" or "pre-react"). The resin can be further treated or applied as a coating or binder, as desired, and then cured. The urea addition also contributes to improved anti-punk characteristics for the cured binder. Urea is also used to extend phenol/formaldehyde resins for use in fiberglass binders. Urea is available at approximately 20% of the cost of the alkaline phenol/formaldehyde resoles commonly used in fiberglass binders. Thus, an extension of the binder with 30% urea provides a substantial cost savings. Accordingly, urea serves the dual function of providing a lower cost resin as well as reducing emissions of formaldehyde.

To obtain a typical urea-extended resole binder resin, a mixture of phenol and formaldehyde is reacted, with a suitable alkaline catalyst, in one or more steps. The resole resins are generally prepared by reacting a phenol with an excess molar proportion of formaldehyde in the presence of a basic catalyst, such as an inorganic alkaline catalyst or an amine catalyst. Most resins for the fiberglass industry are catalyzed with inorganic catalysts because of their low cost and non-volatility.

A typical phenolic resin to be used as a binder for glass fiber insulation is made at a formaldehyde/phenol mole ratio as high as six to virtually eliminate free phenol in the resin. The high formaldehyde/phenol ratio required to achieve the very low free phenol concentration results in high free formaldehyde concentrations. The high percentage of free formaldehyde in the resin must be scavenged by the addition of a large amount of urea or other formaldehyde scavenger. Urea is added after neutralizing the resin and most often just prior to use of the resin. When the urea is added, the level of free formaldehyde is typically reduced to about 0.5 to about 1.5% after the premix is allowed to react at room temperature for a few hours.

The reaction conditions, temperature, catalyst amount, etc., are adjusted to favor phenol methylolation reactions over condensation reactions. Notwithstanding the desire to favor methylolation reactions, some condensation of methylolated phenolic monomers still occurs, producing undesirable dimer species. Such dimers can form an undesirable crystalline precipitate during resin storage, especially in solutions with a low formaldehyde content. This precipitation phenomenon is a particular problem in processes using formaldehyde scavengers. The most common organic compounds that precipitate in urea-extended resole resins are a two unit methylolated phenolic species (tetradimer) and a dimethylolated urea (DMU). Crystallization of tetradimers can cause the blockage of lines, interruption of normal operations, and reductions in resin use efficiency. The crystallized material is difficult to dissolve and hinders uniform application of the resin to the glass fiber. Due to the very poor tetradimer stability of the premix solutions of inorganic base-catalyzed resins and urea, vigorous precautions must be taken with the inorganic base-catalyzed resins, to avoid tetradimer crystal growth, for example, by regular cleaning of the storage tanks and lines, and by shortening the time between the preparation and use of the premix solution.

In the glass fiber industry, a phenolic resin is sometimes produced by a resin manufacturer, and then is sold to a glass fiber producer. Often urea cannot be added to the phenolic resin in the resin manufacturers site because the premix is not stable enough to permit it to be stored for two to three weeks without tetradimer precipitation. Consequently, most phenolic fiberglass resins are sold without any added urea.

Although efforts in the industry to eliminate or substantially reduce formaldehyde are well known, less well known is the fact that ammonia emissions are also under extreme scrutiny, with several states having exceptionally stringent requirements in this regard. Thus, it is desirable to lower both the formaldehyde and ammonia emissions from fiberglass binder compositions.

Accordingly, a need remains for a low emissions process for making a resinous binder low in free phenol and dimer content suitable for use in glass fiber based insulation mats. Such a need is fulfilled by the invention described in detail below.

SUMMARY OF THE INVENTION

It is one object of the present invention to provide a low free phenol aqueous phenouformaldehyde resole resin. It is a feature of this invention that, compared to prior processes, higher levels of methylolation catalyst may be used at lower methylolation reaction temperatures to achieve lower free phenol levels in a resole resin. A mixture of inorganic and organic methylolation catalysts may be used.

It is another object of this invention to provide a low phenol emissions process for applying a urea-extended phenol/formaldehyde binder solution to hot glass fibers.

It is another object of this invention to provide a low ammonia emissions process for applying a urea-extended phenol/formaldehyde binder solution to hot glass fibers. It is a feature of this invention that polyacrylic acid may be used to partially offset the amount of ammonium sulfate, or other latent acid, that in the past has been added to a urea-extended premix prior to curing of the binder solution in a heated oven.

It is yet another object of this invention to provide a phenol/formaldehyde resole resin composition having improved speciation compared to prior resin compositions, and a method of making the same. Specifically, compared to prior compositions having comparable levels of free phenol, the resole resin of the present invention includes increased concentrations of more highly methylolated phenolic species, such as trimethylol phenol.

It is still another object of this invention to provide a phenol/formaldehyde resole resin composition having a reduced tendency to precipitate and cause pluggage in commercial process lines. Specifically, compared to prior compositions having comparable levels of free phenol, the resole resin of the present invention includes reduced concentrations of dimer, trimer, and other phenolic species which have a tendency to precipitate.

Yet another object of this invention is to provide co-binder solution including urea-extended phenol/formaldehyde binder and polyacrylic acid binder.

Still yet another object of the invention is a glass fiber mat made from glass fibers coated with a cured thermoset urea-extended phenol/formaldehyde and polyacrylic acid co-binder.

These and other objects of the present invention are accomplished by the low free phenol aqueous phenol/formaldehyde resole resin, low emissions process for making an aqueous urea-extended phenolic binder, and a glass fiber product including a cured thermoset binder disclosed herein.

According to one aspect of the invention, an aqueous phenol/formaldehyde resole resin is provided. The resole resin is characterized by both low free phenol and improved speciation. Another aspect of the invention relates to a low emissions method of making a urea-extended phenol/formaldehyde binder. Yet another aspect of the invention relates to a glass fiber product including a cured co-binder system of a urea-extended phenol/formaldehyde binder and a polycarboxylic acid polymer. These and other aspects of the invention will become apparent from the detailed discussion set forth below. Up to around 48% lowered phenol emissions is accomplished without adverse impact on process operation. Another advantage is reduced ammonia emissions and reduced requirements for ammonium sulfate as latent catalyst.

DETAILED DESCRIPTION OF THE PREFERRED EMBODIMENT(S)

Figure 1:
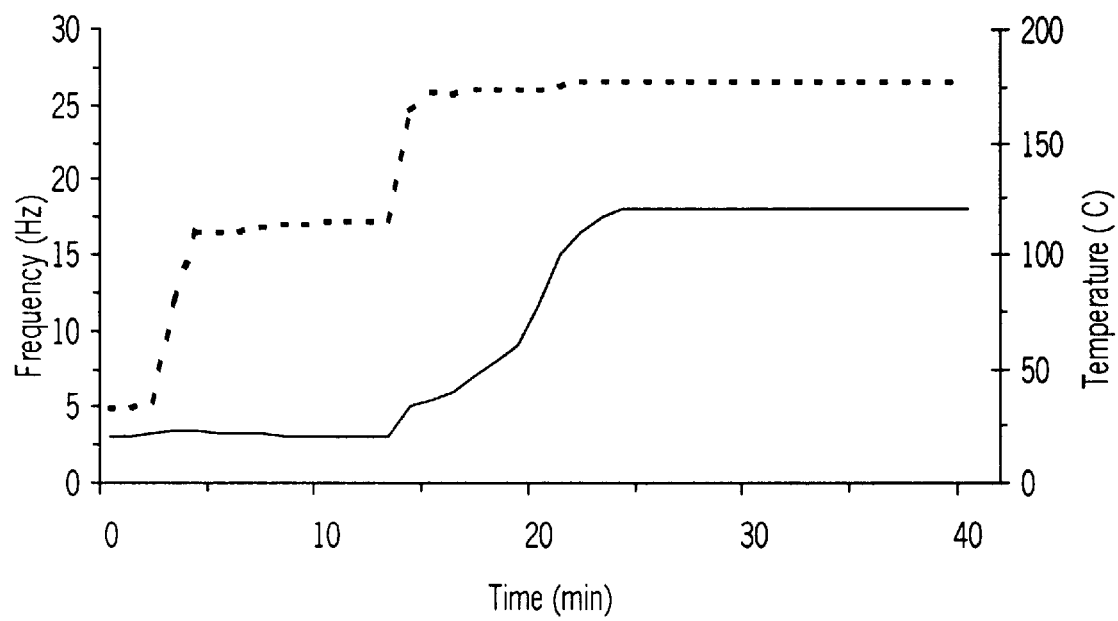
FIG. 1 is a dynamic mechanical analyzer trace of a phenol-formaldehyde/polyacrylic acid co-binder prepared from a co-catalyzed phenolic resin prepared in accordance with the present invention.

The invention will now be described in more detail by way of example with reference to the embodiment(s) described herein. It should be kept in mind that the following described embodiment(s) is/are only presented by way of example and should not be construed as limiting the inventive concept to any particular physical configuration.

One aspect of the invention relates to a low phenol emissions process for making a glass fiber product including a cured thermoset co-binder derived from an aqueous co-binder composition including an extended phenolic binder and a polycarboxylic acid binder. The aqueous co-binder composition is prepared by preparing an aqueous phenolic resole resin under alkaline conditions, extending the resole resin under alkaline conditions using an appropriate extender to form a reaction pre-mix, combining the phenolic constituents with a polycarboxylic acid polymer, applying the aqueous co-binder system to glass fibers, and curing the aqueous phenolic binder and polycarboxylic acid polymer binder under acidic condition to form the glass fiber product including the cured thermoset co-binder.

A phenolic resole resin may be prepared according to the following method in which phenol is methylolated by a suitable aldehyde. The preferred aldehyde is formaldehyde. Formaldehyde is available in many forms. Paraform (a solid, polymerized formaldehyde) and formalin solutions (aqueous solutions of formaldehyde, sometimes with methanol, in 37%, 44%, or 50% formaldehyde concentrations) are commonly used forms. Formaldehyde also is available as a gas. Any of these forms is suitable for use in the practice of the invention. Further, the formaldehyde may be partially or totally replaced with any suitable aldehyde as known in the art. Typically, formalin solutions low in methanol are preferred as the formaldehyde source. An initial charge of phenol is mixed with an excess of aldehyde. Preferably, the aldehyde:phenol molar ratio is about 2:1 to about 6:1, more preferably about 3.5 to about 4.25:1. Phenol/formaldehyde binders made using an aldehyde:phenol ratio in the range of about 2:1 to about 2.5:1 are especially useful in formulating wood adhesives, e.g., adhesives for laminating plywood, while phenol/formaldehyde binders made using an aldehyde:phenol ratio in the range of about 3.5:1 to about 4.25:1 are especially useful in binding glass fibers to form thermal insulation mats.

The methylolation reaction between phenol and the aldhedyde takes place under alkaline conditions. Preferably, the pH is about 7.5 to about 10.0, more preferably about 8.5 to about 9.5. The methylolation reaction preferably takes place in the presence of an effective amount of an alkaline methylolation catalyst. Preferably, the methylolation catalyst constitutes about 3 to about 20% by weight, more preferably about 5 to about 15% by weight, based on the initial charge of phenol. Most preferably, the catalyst concentration is greater than 5 to about 15% by weight.

The methylolation catalyst preferably includes an organic base and an inorganic base. The organic base may be selected from functionalized hydroxy-group containing organic bases, such as alkanolamines. Preferably, the organic base is a tertiary alkanolamine, such as triethanolamine, 2-dimethylamino-2-hydroxymethyl-1,3-propanediol (DMTA), or combinations thereof. The organic base preferably constitutes 0 to about 10% by weight based on the initial charge of phenol.

The inorganic base component of the methylolation catalyst may be any inorganic base, such as an alkali metal hydroxide. A preferred alkali metal hydroxide is sodium hydroxide. The inorganic base may be present in any amount effective to catalyze methylolation of phenol. Preferably, about 5 to about 10% by weight of an inorganic base based on the initial charge of phenol is used.

Methylolation of phenol may take place at a temperature of less than 150° F., preferably at about 120° to about 135° F. Most preferably, methylolation occurs at about 125° F. The exothermic reaction mixture is cooked for a sufficient period of time to reduce free phenol to the desired level, such as to not more than 0.35 wt. %.

Preferably, the phenolic resole resin is cooked until free phenol is reduced to not more than 0.25%, more preferably to 0.2–0.25%, and most preferably to about 0.2%. Preparation of the phenolic resole resin is complete when the desired free phenol level is reached. The free phenol level is determined using analytic techniques, such as gas chromatography, generally known to those skilled in the art. Preferably, once the desired free phenol level is reached, the phenolic resole resin is cooled to less than about 90° F., preferably to less than about 60° F.

The phenolic resole resin is extended and excess aldehyde is consumed, by addition and reaction of an aldehyde scavenger with the phenolic resole resin. The aldehyde scavenger reacts with at least some, and preferably most, of the excess aldehyde present in the phenolic resole resin after the methylolation reaction. The preferred formaldehyde scavenger is urea. Other aldehyde scavengers which can be used include melamine, dicyandiamide, methylol melamine, methylol urea, and other compounds known to those skilled in the art.

As noted above, the binder curing reaction proceeds under acidic conditions. Accordingly, the inorganic base and organic base employed in the methylolation step to achieve the desired speciation is preferably neutralized. Neutralization of the base catalyst may be achieved in the present invention through a combination of polycarboxylic acid polymers having pendant acid groups and a latent acid catalyst, such as ammonium sulfate. The ammonium sulfate reacts with the inorganic base to form sulfuric acid which catalyzes the binder curing reaction and gaseous ammonia, an undesired emissions.

An effective amount of a polycarboxylic acid polymer having pendant carboxylic acid group, such as polyacrylic acid, is preferably combined with the phenolic substitutents. Preferably, the polycarboxylic acid polymer is combined with the phenolic constituents before any aqueous binder is applied to the glass fibers. The polycarboxylic acid polymer may be combined with the phenolic constituents, for example, after formation of the resole resin, after formation of the reaction pre-mix, or immediately prior to application of the aqueous co-binder solution to the glass fibers. The amount of polycarboxylic acid polymer combined with the phenolic constituents may range from about 0 to about 50% by weight, preferably from about 2 to about 15% by weight, and more preferably, from about 5 to about 10% by weight, based on total resin solids.

The ratio of pendant carboxylic acid groups to hydroxy groups provided by the organic base described above is preferably about 1.4 to about 2.5. More preferably, the ratio of pendant carboxylic acid groups to hydroxy groups is about 2.0 to about 2.5. Preferably, the total number of acid equivalents provided by the polycarboxylic acid polymer does not exceed the total number of base equivalents provided by the combination of the inorganic base and organic base catalyst.

A preferred polyacrylic acid polymer having an average molecular weight of about 2,000 to about 15,000, preferably about 2,000 to about 6,000, can be obtained from Rohm & Haas Company, Philadelphia, Pa., USA.

The latent acid, preferably ammonium sulfate, is preferably added to the pre-mix before application of the aqueous co-binder to the glass fibers. The additive is used primarily to neutralize the inorganic base catalyst and acidify the aqueous binder on the glass fibers to a pH of about 4 to about 6.5, preferably about 4.5, thereby catalyzing the curing reaction. The weight ratio of the latent acid and polycarboxylic acid polymer is about 0 to about 5, preferably about 0.3.

Various conventional additives may be added to the reaction pre-mix before or after the polycarboxylic acid polymer is combined with the phenolic constituents, such as silane, oil emulsion, and dyes, if desired. The aqueous co-binder is applied to the glass fibers in any conventional manner, such as spraying the aqueous co-binder directly onto the formed glass fibers. The aqueous co-binder is cured by any conventional manner. such as by passing the binder-coated fibers through a curing oven heated to 400° F. to 650° F.

The following examples demonstrate the improved speciation of an aqueous phenol/formaldehyde resole resin according to one aspect of the invention. In the examples below, the result reported as "free phenol" refers to the direct measurement of phenol in the aqueous sample by gas chromatographic (GC) analysis. The "phenol," "monomethylol phenol (MMP)," "dimethylol phenol (DMP)," "trimethylol phenol (TMP)," "dimers," and "trimers" results are calculated based on the relative area of each species' GC peak compared to the combined area of only the phenolic species, not the entire sample, i.e., exclusive of other components in the sample, such as water. The phenolic resin samples, typically 45% solids, were derivatized with a silanol reagent and injected into a gas chromatograph.

Comparative Example A

A sufficient quantity of a 50 wt. % solution of formaldehyde (F) in water was combined with phenol (P) at a F:P molar ratio of 4.25:1. The formaldehyde/phenol mixture was heated to 110° F. A sufficient quantity of a 50 wt. % solution of sodium hydroxide was added to charge 5% by weight based on the initial charge of phenol. The exothermic reaction was allowed to cook at 122° F. for 2 hours. The mixture was then heated to 140° F. to drive the reaction to a free phenol content of 0.35% by weight resulting in the phenolic resole resin. The phenolic resole resin was assayed for reaction products. The results are tabulated in Table 1.

EXAMPLE 1

The conditions of Comparative Example A were repeated, except sodium hydroxide was added to charge 10% by weight based on the initial charge of phenol. The reaction was cooked at 125° F. to drive the reaction to a free phenol content of 0.37% by weight. The phenolic resole resin was assayed for reaction products.

The speciation results for Comparative Example A and Example 1 are tabulated in Table 1.

TABLE 1

| Species | Comparative Example A | Example 1 | Increase (decrease), % |
| --- | --- | --- | --- |
| Phenol | 0.7 | 0.66 | (5.7) |
| Monomethylol phenol (MMP) | 4.03 | 3.93 | (2.5) |
| Dimethylol phenol (DMP) | 10.55 | 10.43 | (1.1) |
| Trimethylol phenol (TMP) | 48.99 | 57.09 | 16.5 |
| Dimers | 32.1 | 25.49 | (20.6) |
| Trimers | 3.64 | 2.40 | (34.1) |
| Free Phenol | 0.35 | 0.37 | 5.7 |

As indicated in Table 1, use of higher catalyst concentration (10% vs. 5%) and lower cook temperature (125° F. average temperature vs. 122°–140° F.) resulted in a significantly higher (16.5% higher) concentration of the desired reaction product, trimethylol phenol (TMP), and lower concentrations of the undesired dimers and trimers at comparable levels of free phenol (0.37 vs. 0.35%). These test results demonstrate that significantly improved reaction selectivity, i.e., speciation, for the desired trimethylolphenol product of the methylolation reaction of phenol by formaldehyde can be accomplished without significant increase in free phenol levels by using a higher catalyst concentration and carrying out the reaction at lower temperatures.

Comparative Example B

Comparative Example B was a commercially available phenolic resin provided by the Georgia Pacific Company with a chemical composition similar to that of Comparative Example A, but with a lower free phenol content (0.26%).

EXAMPLES 2 and 3

In Examples 2 and 3, the same reaction as in Example 1 was repeated except the reactions were driven to lower free phenol levels, i.e., 0.26% and 0.28%, respectively.

The speciation results for Comparative Example B and Examples 2 and 3 are tabulated in Table 2.

TABLE 2

| Species | Comparative Example B | Example 2 | Example 3 | Average Increase (decrease), % |
| --- | --- | --- | --- | --- |
| Phenol | 0.54 | 0.47 | 0.54 | (6.5) |
| Monomethylol phenol (MMP) | 3.16 | 3.03 | 3.54 | 4.0 |
| Dimethylol phenol (DMP) | 8.80 | 8.71 | 9.32 | 2.4 |

TABLE 2-continued

| Species | Comparative Example B | Example 2 | Example 3 | Average Increase (decrease), % |
| --- | --- | --- | --- | --- |
| Trimethylol phenol (TMP) | 47.84 | 54.81 | 57.20 | 17.1 |
| Dimers | 33.66 | 29.74 | 26.91 | (15.8) |
| Trimers | 6.00 | 3.51 | 2.49 | (50.0) |
| Free Phenol | 0.26 | 0.26 | 0.28 | 3.8 |

As indicated in Table 2, in comparison to the commercially available Comparative Example B resin, the resin of the present invention resulted in a significantly higher (17.1% higher) concentration of the desired reaction product, trimethylol phenol (TMP) and lower concentrations of the undesired dimers and trimers at comparable levels of free phenol (0.27 vs. 0.26%).

Comparative Example C

Comparative Example C was a commercially available resin provided by the Georgia Pacific Company with a chemical composition similar to that of Comparative Examples A and B, but with an even lower free phenol content (0.19%).

EXAMPLES 4 and 5

In Examples 4 and 5, the same reactions as in Examples 1, 2, and 3 were repeated except the reactions were driven to even lower free phenol levels, i.e., 0.20% and 0.19%, respectively.

The speciation results for Comparative Example C and Examples 3 and 4 are tabulated in Table 3.

TABLE 3

| Species | Comparative Example C | Example 4 | Example 5 | Average Increase (decrease), % |
| --- | --- | --- | --- | --- |
| Phenol | 0.26 | 0.37 | 0.36 | 40.4 |
| Monomethylol phenol (MMP) | 2.04 | 2.71 | 2.64 | 31.1 |
| Dimethylol phenol (DMP) | 5.92 | 7.69 | 7.47 | 28.0 |
| Trimethylol phenol (TMP) | 43.73 | 53.96 | 54.82 | 24.4 |
| Dimers | 41.06 | 31.14 | 31.10 | (24.2) |
| Trimers | 7.00 | 4.12 | 3.61 | (44.8) |
| Free Phenol | 0.19 | 0.20 | 0.19 | (2.6) |

As indicated in Table 3, in comparison to the commercially available Comparative Example C resin, the resin of the present invention resulted in a significantly higher (24.4% higher) concentration of the desired reaction product, trimethylol phenol (TMP), and lower concentrations of the undesired dimers and trimers at comparable levels of free phenol (0.195 vs. 0.19%).

Accordingly, the resins of Examples 1–5 made by the inventive process are expected to result in better processability, e.g., reduced tendency to precipitate, compared to the commercially available resins tested due to significantly lower dimer and trimer levels.

Another aspect of the invention is the discovery that tertiary alkanolamines, e.g., triethanolamine or DMTA, can be used as both a base catalyst during the methylolation reaction as well as a cross-linking agent for polyacrylic acid polymer during the curing reaction to form a urea-extended phenolic formaldehyde/polyacrylic acid co-binder system.

With both multiple hydroxy and tertiary amine groups, these chemicals can function as a strong base to catalyze preparation of the phenolic resole resin with better speciation and as a crosslinking agent with polyacrylic acid during the curing reaction. Advantageously, some of the base catalyst will not require neutralization because some of the base catalyst is consumed by polyacrylic acid during the curing reaction and incorporated into the binder.

EXAMPLES 6 and 7

The conditions of Examples 4 and 5 were repeated, except sodium hydroxide was added to charge 8% by weight based on the initial charge of phenol followed by the addition of 4% by weight of triethanolamine based on the initial phenol charge. The speciation of the resin is listed in Table 4 along with data for Comparative Example C.

TABLE 4

| Species | Comparative Example C | Example 6 | Example 7 | Average Increase (decrease), % |
|---|---|---|---|---|
| Phenol | 0.26 | 0.44 | 0.31 | 44.2 |
| MMP | 2.04 | 2.86 | 2.19 | 23.8 |
| DMP | 5.92 | 8.27 | 6.72 | 26.6 |
| TMP | 43.73 | 53.69 | 51.94 | 20.8 |
| Dimers | 41.06 | 31.27 | 34.44 | (20.0) |
| Trimers | 7.00 | 3.46 | 4.40 | (43.9) |
| Free Phenol | 0.19 | 0.22 | 0.15 | (2.6) |

As shown in Table 4, the speciation improvements of Examples 6 and 7 over the Comparative Example C resin are comparable to those of Examples 4 and 5. Specifically, TMP concentration is increased while dimer and trimer concentration is decreased.

EXAMPLE 8

The co-catalyzed resins prepared in Examples 6 and 7 were evaluated for shelf life. The resins were stored at 50° F. and room temperature (77° F.). The resins were tested for water tolerance and add dilutability. Water tolerance was evaluated by diluting 5 g of resin with tap water until the solution became hazy. If a resin sample can tolerate 20 times its volume of water, the resin is deemed unlikely to be sufficiently processible in a commercial glass fiber production facility. All co-catalyzed resin samples tested were sufficiently water dilutable even after 90 days of storage at 50° F.

Compared to the water dilutability test, acid dilutability is a more severe test of binder processability. Acid dilutability of the resin was evaluated by diluting 5 g of resin with water to 200 mL followed by titration of the resulting solution with sulfuric acid until it became hazy. At that point, the pH of the solution was measured. A general rule is that if the resin is not acid dilutable to pH 7 or lower, the resin will likely cause processing difficulties, such as filter pluggage, chain stickiness, or premature curing. The 0.15% free phenol co-catalyzed resin sample (Example 7) had about twice as much or more shelf life than that of the 0.19% free phenol Comparative Example C resin sample at both room temperature (77° F.) and at 50° F. as tabulated in Table 5.

EXAMPLE 9

A sodium hydroxide/triethanolamine co-catalyzed resin was prepared as in Examples 6 and 7, but the reaction was driven to even lower free phenol (0.14%) then reacted with a sufficient quantity of urea such that the molar ratio of free formaldehyde to urea was about 1.1:1. The reaction proceeded for three hours at 77° F. A premix of the Comparative Example C resin was also prepared in the same manner. Both premixes were stored at 77° F. and evaluated by acid dilutability. The results indicated that the premix prepared from the co-catalyst had longer shelf life than that prepared from the commercially available resin, i.e., 11 days vs. 5 days, and had even lower free phenol (0.15 vs 0.19%).

TABLE 5

| | Comparative Example C | Co-catalyzed Resin |
|---|---|---|
| Resin Free Phenol (%) | 0.19 | 0.15 |
| Resin Acid Dilutability @ pH 7 (days) (50° F.) | 24 | >71 |
| Resin Acid Dilutability @ pH 7 (days) (77° F.) | 5 | 9 |
| Premix Acid Dilutability @ pH 7 (days) (77° F.) | 5 | 11 |

Another aspect of the invention relates to a cured aqueous urea-extended phenol/formaldehyde and polyacrylic acid co-binder. The phenol/formaldehyde binder is preferably crosslinked to the polyacrylic acid binder by an alkanolamine, preferably by a tertiary alkanolamine, such as triethanolamine. Preferably, the alkanolamine is added to the reaction mixture prior to the phenol methylolation step. Methylolation of the phenol with formaldehyde is preferably carried out in the presence of both an inorganic base catalyst, such as sodium hydroxide, and the alkanolamine. Preferably, the resulting resole resin is extended using a nitrogenous formaldehyde scavenger, such as urea. The extended premix contains the alkanolamine added in the previous step. Prior to application of the extended binder to the formed glass fibers, polyacrylic acid and a latent acid, such as ammonium sulfate, is preferably added to the prereact. The amount of polyacrylic acid added can range from about 0 to about 50 wt. %, preferably, from about 2 to about 15 wt. %, based on the amount of total solids. More preferably, the amount of polyacrylic acid added is about 5% to about 10 wt. % based on the amount of total solids. One purpose of the latent acid is to acidify the binder as it cures thereby catalyzing the curing step. Preferably, the amount of ammonium sulfate added is about 0 to about 5 wt. % based on total solids. If desired, the reaction mixture may be supplemented with about 4 to about 8 wt. % of a catalyst for the polyacrylic acid thermosetting reaction, such as sodium hypophosphite. The amount added is based on the total amount of polyacrylic acid and triethanolamine added. It is believed that the alkanolamine crosslinks the phenol/formaldehyde binder with pendant add groups on the polyacrylic acid backbone. If ammonium sulfate is used as the latent acid, ammonia is released during the heat curing reaction.

The relative proportion of components in the co-binder formulation (pre-cure) immediately prior to application to the formed glass fibers is tabulated in Table 6.

The temperature of the formed glass fibers at the time the binder or co-binder is applied is typically about 150° F. to about 700° F.

TABLE 6

| Co-Binder Component (pre-cure) | Approx. Proportion (wt. % based on total solids) |
|---|---|
| Formaldehyde | 0.1–1.5% |
| Phenol | 0.1–0.5% |
| Methylolated Phenolic Species | 20–60% |
| Sodium Hydroxide | 1–5% |
| Ethanolamine | 0–15% |
| Urea | 10–50% |
| Polyacrylic acid | 0–50% |
| Silane | 0–0.5% |
| Oil Emulsion | 2–15% |
| Ammonium Sulfate | 0–5% |
| Sodium Hypophosphite | 0–5% |

EXAMPLE 10

The co-catalyzed resin premix prepared in Example 9 was further neutralized with polyacrylic acid (7 wt. % based on the initial charge of phenol) and ammonium sulfate (2.7 wt. % based on total solids), supplemented with sodium hypophosphite as a catalyst for the polyacrylic acid thermosetting reaction (6 wt. % based on the total amount of polyacrylic acid and triethanolamine added), and diluted with water to form a 10 wt. % total solids binder solution. The Comparative Example A resin was similarly reacted with urea, diluted, and supplemented with ammonium sulfate to form a typical binder solution for fiber glass insulation production.

Figure 2:
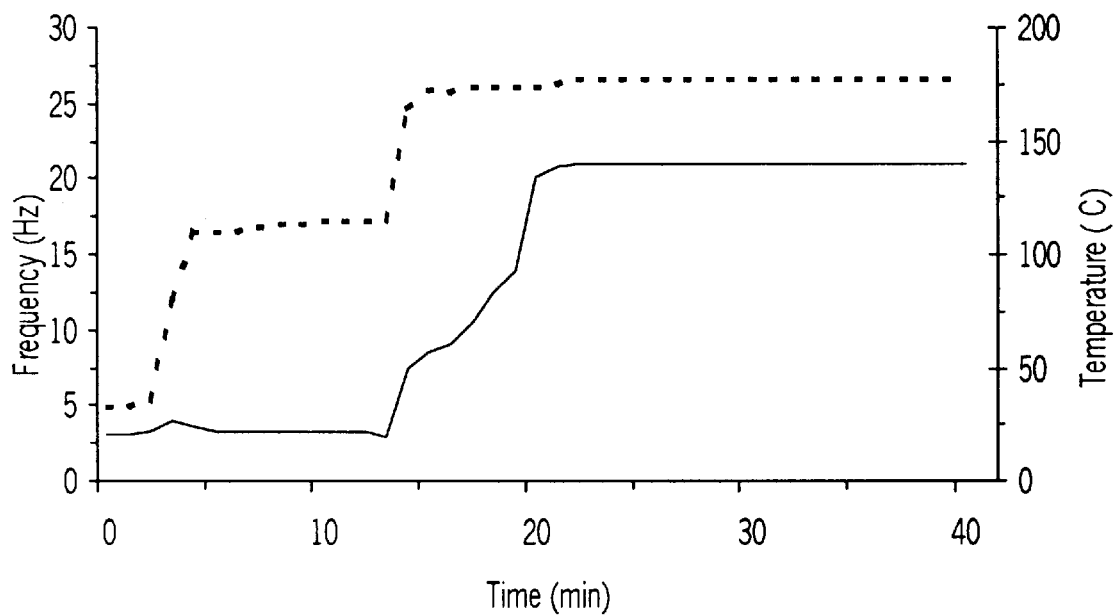
FIG. 2 is a dynamic mechanical analyzer trace of a conventional urea-extended phenol-formaldehyde binder solution prepared in a conventional manner from a commercially available phenolic resin.

Dynamic Mechanical Analyzer (DMA) results for the Example 10 resin and binder solution prepared from the Comparative Example A resin shown in FIG. 1 and FIG. 2, respectively, demonstrate that the co-binder of the present invention made from co-catalyzed resin and polyacrylic acid had a curing pattern very similar to that of the typical phenolic/urea premix binder.

Still another aspect of the invention relates to a glass fiber product including a cured thermoset co-binder. The co-binder formulation is sprayed onto molten glass filaments immediately after formation, for example, by a bushing or other glass fiber forming apparatus. The fibers are preferably sprayed with binder or co-binder as they are falling on the mat collecting conveyor belt below the forming area. Volatile components in the co-binder formulation evaporate upon contact with the hot glass fibers and during heating in the curing oven. As the co-binder formulation cures, the co-binder joins individual fibers together to form a resilient mat useful in thermal insulation and other applications. A typical composition of the cured co-binder is tabulated in Table 7.

TABLE 7

| Cured Co-Binder Component | Approx. Proportion (% by weight) |
|---|---|
| Phenol/formaldehyde/urea binder | 50–100% |
| Polyacrylic acid binder | 0–50% |
| Silane | 0–0.5% |
| Sodium Sulfate | 0–5% |

Conventional additives, such as silane, oil emulsion, lignin, dye, silicone, and lubricants, can be added to the co-binder prepared in Example 10 to formulate a final binder solution suitable for spray application to glass fibers at a forming area. A glass fiber blanket coated with such a co-binder solution can be cured in an oven to form rigid joints between contacting fibers which net the individual glass fibers together to produce bindered glass fiber insulation materials.

The overall performance of the co-catalyzed resin with 0.20% free phenol and neutralized by polyacrylic acid to form a co-binder is equivalent or better than that of a binder derived from the Comparative Example A resin having a free phenol content of 0.35%. By adding about 10% polyacrylic acid binder to the co-catalyzed resin premix, the free phenol was reduced by about 48%. This reduction in free phenol content is expected to result in a significant reduction in phenol emissions from the forming area.

Yet another aspect of the invention relates to a low emissions process for making an aqueous urea-extended phenol/formaldehyde and polyacrylic acid co-binder. The process releases less phenol emissions due to a lower free phenol content in the resin, as noted above. The process releases less ammonia emissions due to use of reduced quantities of ammonium sulfate.

It will be apparent to one skilled in the art that the manner of making and using the claimed invention has been adequately disclosed in the above-written description of the preferred embodiment(s).

It will be understood that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

We claim:

1. A method of making binder-coated glass fibers, comprising:
   providing an initial charge of phenol (P);
   providing formaldehyde (F) at a F:P molar ratio of from about 2:1 to about 6:1;
   reacting said phenol and said formaldehyde in the presence of an effective amount of an alkaline methylolation catalyst to form a phenolic resole resin;
   reacting some of the excess, unreacted formaldehyde in said phenolic resole resin with a formaldehyde scavenger under alkaline conditions to form a reaction pre-mix;
   combining said reaction pre-mix with an effective amount of a base neutralizing salt;
   combining an effective amount of a polycarboxylic acid polymer containing pendant carboxylic acid groups, a polyhydroxy tertiary alkanolamine and a thermoset catalyst with at least one of said phenolic resole resin, extended resole resin, and reaction pre-mix, to form a co-binder solution, wherein said polycarboxylic acid polymer forms a thermoset polymer in the presence of said polyhydroxy tertiary alkanolamine and said thermoset catalyst;
   applying said co-binder solution to glass fibers; and
   curing said co-binder solution.

2. The method of claim 1 wherein said F:P molar ratio is from about 3.5:1 to about 4.25:1.

3. The method of claim 1 wherein said effective amount of said alkaline methylolation catalyst is about 5 to about 20% by weight based on said initial charge of phenol.

4. The method of claim 3 wherein said effective amount of said alkaline methylolation catalyst is about 5 to about 15% by weight based on said initial charge of phenol.

5. The method of claim 1 wherein said alkaline methylolation catalyst includes a hydroxy-containing organic base catalyst and an effective amount of an inorganic base catalyst.

6. The method of claim 5 wherein said inorganic base catalyst is an alkali metal hydroxide.

7. The method of claim 6 wherein said alkali metal hydroxide is sodium hydroxide.

8. The method of claim 5 wherein the amount of said hydroxy-containing organic base catalyst is about 0 to about 15% by weight based on said initial charge of phenol.

9. The method of claim 8 wherein said hydroxy group-containing organic base catalyst is an alkanolamine.

10. The method of claim 9 wherein said alkanolamine is selected from the group consisting of triethanolamine, 2-dimethylamino-2-hydroxymethyl-1,3-propanediol (DMTA), and combinations thereof.

11. The method of claim 5 wherein said effective amount of an inorganic base catalyst constitutes about 5 to about 10% by weight based on said initial charge of phenol.

12. The method of claim 1 wherein the step of reacting said phenol and said formaldehyde takes place at a temperature of less than about 160° F.

13. The method of claim 12 wherein the step of reacting said phenol and said formaldehyde takes place at a temperature of about 120° to about 135° F.

14. The method of claim 13 wherein the step of reacting said phenol and said formaldehyde takes place at a temperature of about 125° F.

15. The method of claim 1 wherein said phenol and said formaldehyde react for a sufficient period of time to reduce the level of free phenol to not more than about 0.35%.

16. The method of claim 15 wherein said level of free phenol is not more than about 0.25%.

17. The method of claim 16 wherein said level of free phenol is not more than about 0.2%.

18. The method of claim 1 wherein after said reacting step, cooling said phenolic resole resin to less than about 100° F.

19. The method of claim 1 wherein said formaldehyde scavenger is urea.

20. The method of claim 1 wherein said base neutralizing salt is ammonium sulfate.

21. The method of claim 1 wherein said effective amount of said polycarboxylic acid polymer is about 0 to about 50% by weight based on total resin solids.

22. The method of claim 21 wherein said effective amount of said polycarboxylic acid polymer is about 2 to about 15% by weight based on total resin solids.

23. The method of claim 22 wherein said effective amount of said polycarboxylic acid polymer is about 5 to about 10% by weight based on total resin solids.

24. The method of claim 1 wherein said polycarboxylic acid polymer is polyacrylic acid.

25. The method of claim 24 wherein said polyacrylic acid polymer has an average molecular weight of about 2000 to about 15000.

26. The method of claim 25 wherein said polyacrylic acid polymer has an average molecular weight of about 2000 to about 6000.

27. The method of claim 1 whereby the ratio of said pendant carboxylic acid groups to said hydroxy groups in said pre-mix is about 1.4 to about 2.5.

28. The method of claim 27 whereby the ratio of said pendant carboxylic acid groups to said hydroxy groups in said pre-mix is about 2.0 to about 2.5.

29. The method of claim 1 wherein the weight ratio of said base neutralizing salt and polycarboxylic acid polymer is about 0.5 to about 2.

30. The method of claim 29 wherein the weight ratio of said base neutralizing salt and polycarboxylic acid polymer is about 1.

31. The method of claim 1 wherein said applying step is performed by spraying.

32. The method of claim 1 wherein said curing step is performed by neutralizing said organic base catalyst with said base neutralizing salt and cross-linking said polyacrylic acid polymer with said organic base catalyst.

33. A method of making a phenolic/polyacrylic acid-cobinder comprising:
    providing a phenolic resole resin containing an effective amount of an organic hydroxyl-group containing amine;
    combining a polycarboxylic acid polymer with said organic hydroxyl group containing amine and a thermoset catalyst in the presence of said phenolic resole resin to form a co-binder solution; and
    curing said co-binder solution to form said cured co-binder.

34. A heat-curable aqueous composition comprising:
    formaldehyde;
    phenolic compound;
    methylolated phenolic species;
    alkanolamine crosslinking agent;
    thermoset catalysts; and
    polyacrylic acid.

35. The composition of claim 34 further comprising:
    an inorganic base catalyst.

36. A binder-coated glass fiber comprising:
    a glass fiber; and
    a cured reaction product of:
       a urea-extended phenol-formaldehyde resole resin;
       polyacrylic acid; alkanolamine crosslinking agent; and
       a sodium hypophosphate thermoset catalyst.

37. A glass fiber mat comprising:
    a plurality of randomly oriented glass fibers; and
    a cured binder composition that is the reaction product of:
       a urea-extended phenol-formaldehyde resole resin;
       polyacrylic acid; alkanolamine crosslinking agent; and
       a sodium hypophosphate thermoset catalyst.

38. The method of claim 1 wherein said polyhydroxy tertiary alkanolamine is triethanolamine.

39. The method of claim 1 wherein said thermoset catalyst is sodium hypophosphite.

40. The composition of claim 34 wherein said thermoset catalyst is sodium hypophosphite.

41. The product of claim 36 wherein said thermoset catalyst is sodium hypophosphite.

42. The product of claim 37 wherein said thermoset catalyst is sodium hypophosphite.

* * * * *